INVENTOR
R. C. AVERY
BY H. A. Patterson
ATTORNEY

Dec. 12, 1950 R. C. AVERY 2,533,342

TANDEM SWITCHING SYSTEM

Filed Oct. 9, 1947 4 Sheets-Sheet 2

INVENTOR
R. C. AVERY
BY H. A. Patterson
ATTORNEY

Dec. 12, 1950 R. C. AVERY 2,533,342

TANDEM SWITCHING SYSTEM

Filed Oct. 9, 1947 4 Sheets-Sheet 3

INVENTOR
R. C. AVERY
BY
A. A. Patterson
ATTORNEY

Dec. 12, 1950 R. C. AVERY 2,533,342

TANDEM SWITCHING SYSTEM

Filed Oct. 9, 1947 4 Sheets-Sheet 4

INVENTOR
R. C. AVERY
BY
H. A. Patterson
ATTORNEY

Patented Dec. 12, 1950 2,533,342

UNITED STATES PATENT OFFICE 2,533,342

TANDEM SWITCHING SYSTEM

Robert Campbell Avery, Jackson Heights, N. Y., assignor to American Telephone and Telegraph Company, a corporation of New York Application October 9, 1947, Serial No. 778,977

4 Claims. (Cl. 179—18)

This invention relates to telephone systems and has for its object to facilitate the handling of tandem connections in such systems.

Heretofore, telephone calls between offices having no direct connecting trunks have, in general, been handled either by special tandem equipment or by the use of a discriminating digit which results in a reduction of the amount of equipment available for local service.

In accordance with the present invention, means is provided for handling tandem calls at a local office without sacrificing any of the local equipment.

The invention is especially applicable to cross bar systems of the type disclosed in United States Patents 2,089,921 to W. W. Carpenter, August 10, 1937; 2,235,803, to W. W. Carpenter, March 18, 1941; and 2,232,371 to Dehn and Myers, February 18, 1941.

Accordingly means is provided in the common control equipment of such a system for registering either a line designation or a trunk designation and in the latter case for modifying the operation of the control equipment to select an idle trunk.

More specifically, the terminating sender which normally responds to the reception of a five-digit line designation to associate itself with a switch controlling marker, responds to a two-digit trunk designation to associate itself with a marker and to render the marker effective to handle the two-digit trunk designation.

These and other features of the invention will be more apparent from a consideration of the following description read in connection with the attached drawing in which:

Figure 1 shows a tandem trunk, together with a schematic showing of a sender link circuit and of a repeater link circuit;

Fig. 5 shows the manner in which Figs. 1 to 4 are to be arranged.

Figures 1, 5:
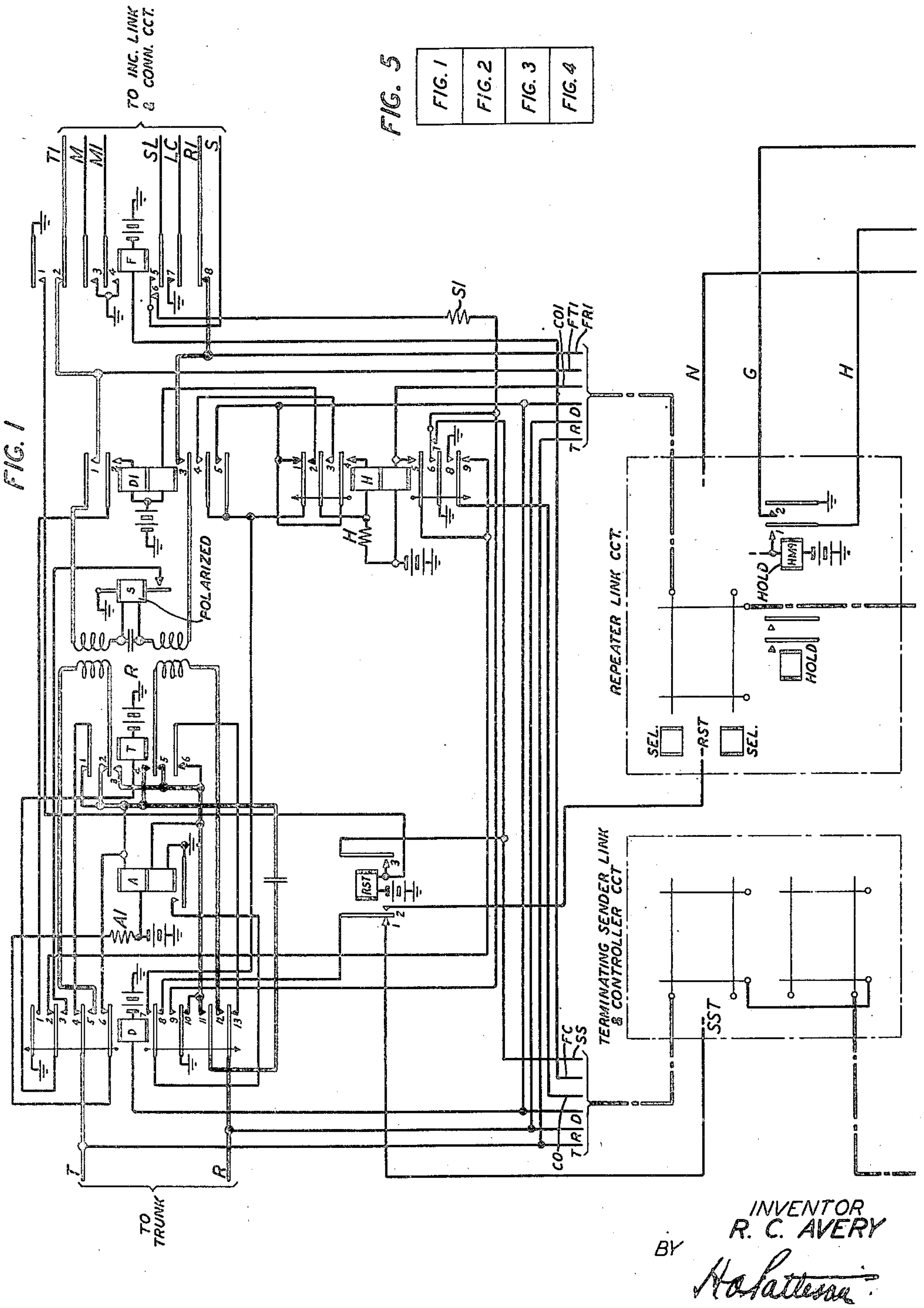

As described in detail in the above-mentioned patents the setting up of a telephone connection in the cross bar system takes place in two stages, an originating stage and a terminating stage. The originating stage includes the automatic extension of the calling line to a district junctor, followed by a directive operation in which the designation of the wanted office and line is registered in an originating register sender, and the sender is associated with an originating marker which controls the selection of a trunk in accordance with the designation of the wanted office as received from the sender and establishes a connection between the trunk and the district junctor. The terminating stage includes the automatic selection of a terminating sender in response to the seizure of the incoming junctor in which the selected trunk terminates. When the terminating sender has been selected, it is connected with the originating sender and the number of the wanted line is transmitted from the originating sender to the terminating sender by means of five series of revertive pulses, after which the originating sender is released. A terminating marker is then associated with the terminating sender, receives the line number from the sender, determines the location and class of the wanted line, tests it to determine whether it is idle and establishes a connection between the incoming junctor and the called line, thus completing the connection between the calling line and the called line.

In Carpenter Patent 2,235,803 it is pointed out that the five trains of revertive pulses may be used for the control of panel type selectors in a panel terminating office. Because of the limitations imposed by the panel selectors, the first set of revertive impulses transmitted never exceeds five, while the second set of revertive impulses never exceeds four.

The originating cross bar sender is also equipped to receive two sets of revertive impulses to control an intermediate panel "office" selector or a cross bar tandem sender when required. The number of these pulses is determined by the marker in accordance with the route and, therefore, any arbitrary number of pulses may be used. The use made of this fact in the present disclosure will be pointed out hereinafter.

The drawings of the present disclosure are based on the drawings of the above-mentioned Carpenter Patent 2,089,921 to which reference is made for a description of the complete circuits and operations. For convenience in such reference, the circuit elements taken from the Carpenter disclosure, which are to be found in Figs. 3 and 4, have been given the same reference numerals as used in that patent, the added elements being identified by letter designations.

When the equipment at the originating office has functioned to select the trunk of Fig. 1, a circuit is completed from battery through the upper winding of relay A, contact 1 of relay T, contact 4 of relay D, over the tip conductor T and thence as shown in Carpenter Patent 2,245,803, through the winding of a stepping relay in the originating sender, back to ring conductor R, contact 13 of relay D, contact 6 of relay T, contact 10 of relay D to ground. Battery through resistance A1 is connected in parallel with the upper winding of relay A over contact 6 of relay D to improve the operating condition for the sender relay, but relay A is able to operate in the circuit traced.

Figure 3:
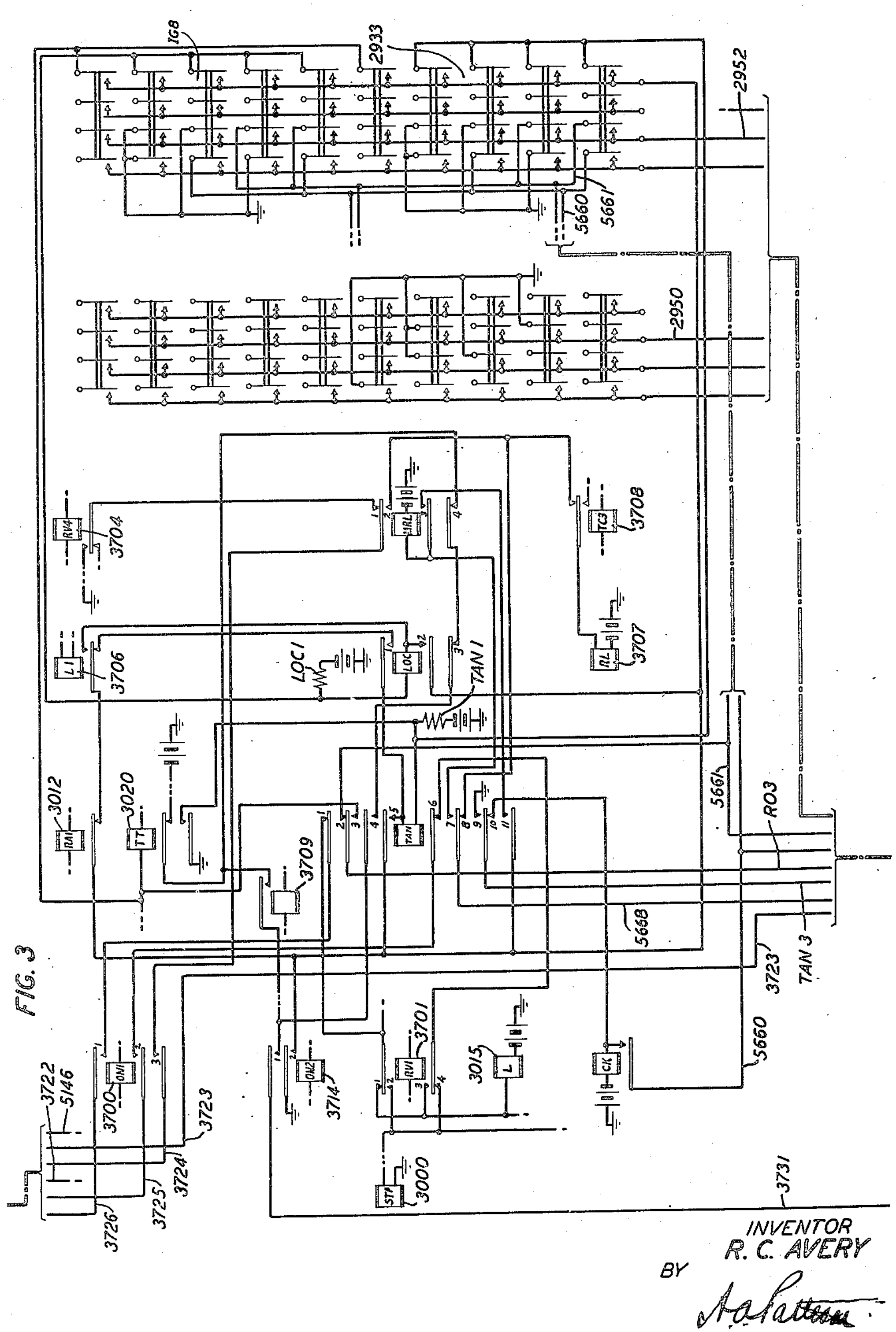
Fig. 3 shows parts of a terminating sender.

Relay A, in operating closes a circuit from ground at its front contact, contact 8 of relay D, contact 1 of relay RST to the start conductor SST for the sender link circuit. The sender link control circuit operates as described in Patent 2,089,921 to close cross-points in primary and secondary link switches to extend the six conductors T, R, D, CO, FC and SS through to conductors 3726, 3725, 3722, 3724, 3723 and 5146 respectively in an idle sender such as shown in Fig. 3. When the sender is ready to receive the line designation, relays 3700 and 3704 and 3714 are operated. Relay 3700, in operating, extends tip conductor 3726 over its contact 1, contact 1 of relay TAN, contact 1 of relay 3701 to the winding of relay 3015 and battery. Relay 3700 also extends ring conductor 3725 over its contact 2, contact 6 of relay TAN, contact 4 of relay 3701 to the winding of relay 3000 and ground. Relay 3015 and the stepping relay of the originating sender operate in this circuit, but relay 3000 is shunted by the ground at contact 10 of relay D. Responsive to the operation of relay 3015, a circuit is closed from ground over the front contact of relay 3704, contact 1 of relay MRL, contact 3 of relay 3700, conductor 3724, through the sender link to conductor CO, contact 9 of relay H, contact 2 relay D to the winding of relay T and battery. Relay T operates in this circuit, disconnecting the winding of relay A from the tip and ring conductors, as well as disconnecting ground from the ring conductor, thereby leaving relays 3015 and 3000 connected to the stepping relay of the originating sender and permitting relay 3000 to operate in the pulsing circuit. Relays 3000, 3015 and the stepping relay in the originating sender function as set forth in the Carpenter Patent 2,089,921 to bring about the generation, transmission and registering of trains of revertive pulses to cause the setting of the cross bar register. Only the incoming brush vertical and the incoming group vertical of the register are shown.

When relay 3015 operates in the pulsing circuit above traced, it in turn operates relay 3706. Relay 3012 is operated and released alternately as a part of the setting of the cross bar register, being operated after frame registration, which takes place prior to the establishment of the pulsing circuit, and released after the registration of the first train of revertive pulses on the incoming brush vertical. At the end of each train of pulses, the pulsing circuit is opened by the originating sender long enough for both relay 3015 and relay 3706 to release. Therefore, at the beginning of the second train of pulses, a circuit is closed from battery through resistance LOC1, winding of relay LOC, front contact of relay 3706, back contact of relay 3012 to ground at contact 2 of relay 3714. Relay LOC operates and locks over its contact 2 to ground at contact 2 of relay 3714.

When relay 3706 releases at the termination of the second train of pulses, registered on the incoming group vertical, a circuit is closed from battery through resistance TAN1, winding of relay TAN, contact 1 of relay LOC, back contact of relays 3706 and 3012 to ground at contact 2 of relay 3714.

In the case of a local call, as mentioned above, one of the lower four cross-points, for example cross-point 2933 would be closed. Therefore a circuit would be completed from ground at contact 2 of relay 3714, outer right contact of cross-point 2933, to battery through resistance TAN1, in shunt of the winding of relay TAN, either preventing the operation of that relay or causing it to release immediately.

Figure 4:
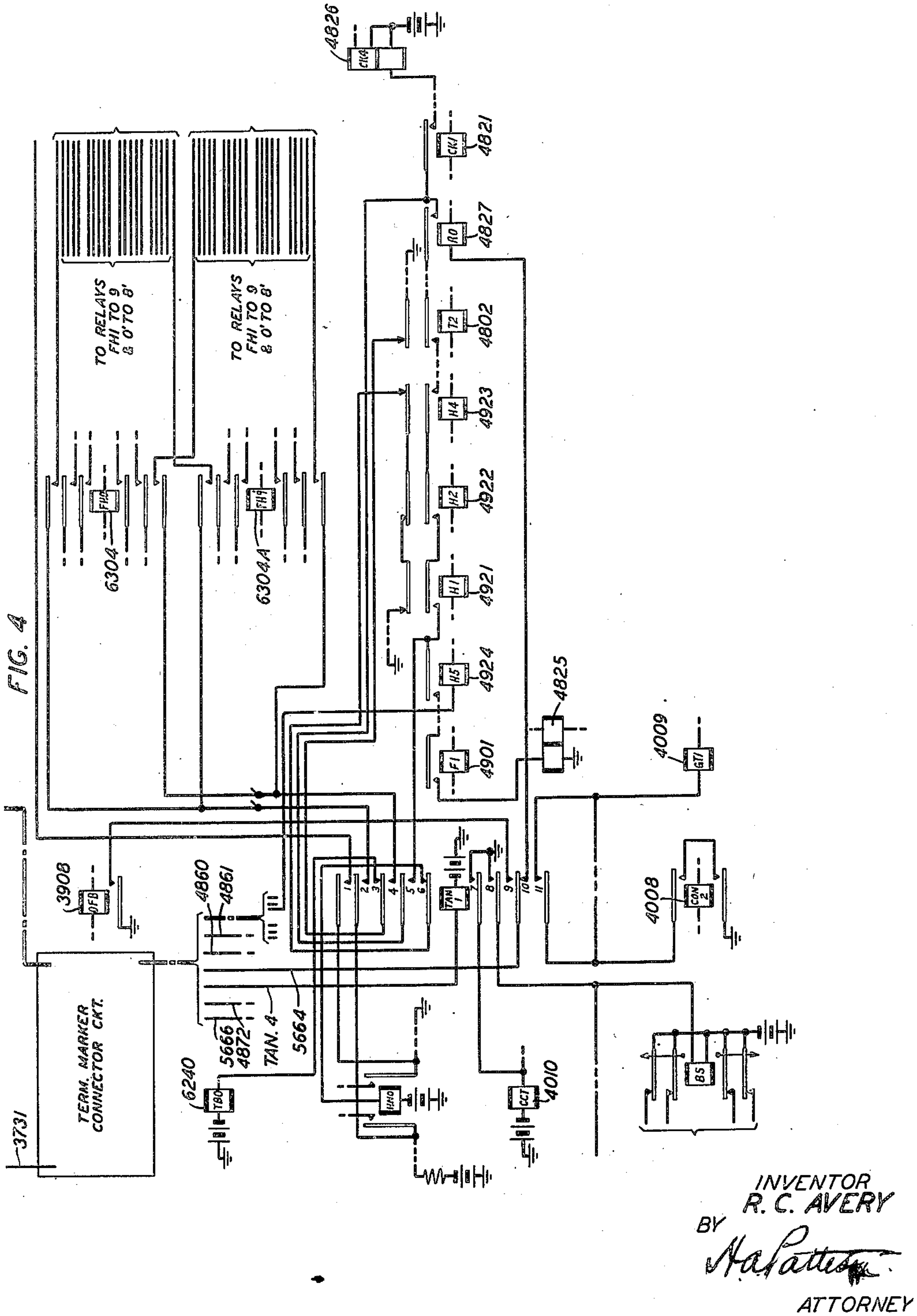
Fig. 4 shows a schematic marker connector and parts of a terminating marker.

With relay TAN released, the pulsing circuit is reclosed to the originating sender and the next set of revertive pulses may be sent. When five sets of revertive pulses have been transmitted and registered, relay 3701 is operated to transmit a reverse battery signal to the originating sender, after which relay 3709 is operated. With relay 3709 operated, battery is connected over the back contact of relay 3020, front contact of relay 3709, contact 1 of relay 3714 to the start conductor 3731 leading to the terminating marker connector, to bring about the connection of the sender with an idle terminating marker such as shown in Fig. 4.

On the other hand, in the case of a tandem call, the originating sender will be set to receive two sets of pulses identified as office brush and office group selection pulses under the control of registrations set up by the originating marker in accordance with the route to be used. If the call is to be routed through a combination office of the sort shown in the present disclosure, the office group register will be set to require a number of pulses from six to nine to satisfy the originating sender, for example 8. Therefore, cross-points in the incoming brush and incoming group verticals in the terminating sender of Fig. 3 will be closed as determined by the office brush and office group registers of the originating sender. Assuming that eight revertive pulses are required by the office group register, cross-point IG8 in the incoming group vertical will be closed. With cross-point IG8 operated, a circuit is completed from ground at contact 2 of relay 3714, outer right contact of cross-point IG8, to battery through resistance LOC1, in shunt of the winding of relay LOC, causing relay LOC to release and leaving relay TAN operated.

Relay TAN, in operating, closes a locking circuit for itself over its contact 5 to ground at contact 2 of relay 3714. At contacts 1 and 6 of relay TAN, the pulsing circuit is opened in the terminating sender to prevent the advance of the originating sender to position to make trunk test. At contact 4, relay TAN closes the start circuit for the marker connector, the circuit extending in this case from battery over the back contact of relay 3020, contact 4 of relay MRL, contact 3 of relay LOC, contact 4 of relay TAN, contact 1 of relay 3714 to conductor 3731. When a marker has been associated with the sender, relay TAN, at contact 9, connects ground to conductor TAN3 which is connected through the marker connector and over conductor TAN4 to the winding of relay TAN1 to inform the marker that it is to handle a tandem call.

When the marker and sender have been connected together by the marker connector, conductors 3723, 5668, TAN3, RO3, 5669 and 5661 are connected to conductors 5666, 4372, TAN4, 5664, 4868 and 4861 respectively, while sixteen registration transfer paths are set up between the cross bar register of the sender and the relay registers of the marker. As desscribed in detail in Carpenter Patent 2,089,921, ground is connected according to a predetermined code to certain contacts of the various cross-points, thereby operating the corresponding marker register relays directly. The remaining contacts are connected to checking conductors such as conductors 5660 and 5661 which are supplied with ground from the marker, whereby, in the case of a local call, all of the register relays are operated, completing a chain circuit over all of the register relays. Included in this chain circuit are contacts on checking relays, such as relay 4821, which are operated from the checking ground supply, and on reorder relay 4827 which is operated from ground on the checking conductor 5661 over contact 2 of relay TAN, conductors RO3 and 5664 and contact 10 of relay TAN1. This chain circuit extends from battery through the lower winding of relay 4826, contacts of the checking relays including relay 4821, contact of reorder relay 4827, contacts of the units register relays (not shown), contacts of the tens register relays including relay 4802, contacts of the hundreds register relays 4923, 4922, 4921 and 4924, contacts of the thousands register relays (not shown), contacts of the frame register relays including relay 4901 to ground through the left winding of relay 4825. With relays 4826 and 4825 operated and locked, the checking ground is removed and only those relays operated directly from the sender remain operated.

From the thousands register, in combination with relay 4924 of the hundreds register, one of the five hundreds relays, such as relays 6304 and 6304A, is operated, which in combination with a hundred-block relay such as relay HNO operated from the hundreds register and a twenty-block relay such as relay 6240 operated from the tens register in combination with a units register relay causes the selection of a line choice and a group of twenty lines to be tested.

When the marker has seized the line choice, ground is connected to conductor 5666 connected through the marker connector to conductor 3723 and through the sender link to conductor FC, completing a circuit through the winding of relay F to battery. Relay F at contact 7 grounds conductor LC, thereby operating, in cooperation with the marker, the incoming link connector to associate the marker with the incoming link switches.

Having found the called line idle, an idle channel is selected, the proper ringing condition is set up in the trunk and the continuity of the prepared connection is tested. The latter test causes the operation of relay 4008, which, if the ringing control has been operated properly, causes the operation of relay 4009. With relay 4009 operated, ground is removed from conductor 5666 releasing relay F in the trunk which disconnects conductor S from conductor SL as a signal to the marker. In response to this signal, ground is connected to release conductor 4872.

With relay TAN normal in connection with a local call, ground on conductor 4872, extending to conductor 5668 completes a circuit over contact 8 of relay TAN, back contact of relay 3708 to battery through the winding of relay 3707 causing the sender to release in the usual manner.

In the case of a tandem call, since cross-points are closed only in the frame vertical (not shown) and in the incoming brush and incoming group verticals of the sender, only the relays of the frame register and the thousands register and relay 4924 of the hundreds register can be operated in the marker as a result of the checking operation. In addition relay TAN in the sender opens the circuit of reorder relay 4827, preventing its operation. However, since relay TAN1 is operated, a bridge is closed around the contacts of the hundreds, tens and units register relays, and of reorder relay 4827, the chain checking circuit in the case of a tandem call extending from battery through the lower winding of relay 4826, contact of relay 4821, contact 5 of relay TAN1, contact of relay 4924, over the contacts of the thousands register relays and of the frame register relays, including relay 4901 to ground through the left winding of relay 4825.

The operation of a five hundreds relay such as relay 6304 or 6304A takes place as for a local call. The line choice start lead is closed through contact 2 of relay TAN1 and contact 1 of the operated five hundreds relay. Since relays 4921, 4922 and 4923 are not operated, the zero hundred-block relay HNO would normally be operated, and similarly, since none of the tens register relays are operated the zero twenty-block relay 6240 would normally be operated. However, with relay TAN1 operated, the circuit for operating the HNO relay is opened at contact 6 of relay TAN1, and a circuit for operating the hundred-block relay for the tandem trunks is closed at contact 1 of relay TAN1, while the circuit for operating a twenty-block relay is transferred over contact 4 of relay TAN1 to contacts of the five hundreds relays to cause the operation of the twenty-block relay associated with the tandem trunks. These trunks are located on the line link frame and are tested and an idle one selected in the manner described in Carpenter Patent 2,089,921 for selecting an idle trunk leading to a private branch exchange.

In general the selection of an idle channel and the establishment of the connection between the trunk of Fig. 1 and the selected trunk take place in the usual manner. However, since the ringing equipment is located at the terminating office, the battery for the ringing control relays is supplied over contacts of relay BS so that, with relay TAN1 operated, relay BS is operated from ground over contact 8 of relay TAN1 and none of the ringing control relays may be operated.

Relay TAN1 also closes a circuit at its contact 7 for operating relay 4010 to cancel the continuity test as is done in the case of intercepted calls. After an interval following the operation of the incoming and line switches, relay 4008 is operated under the control of relay 4010, in turn operating relay 4009 over contact 11 of relay TAN1 independent of the ringing control relays. Relay 4009 causes the release of relay F and the grounding of conductor 4872 and therefore of conductor 5668. On the sender, since relay TAN is operated, release conductor 5668 extends over contact 7 of relay TAN to the winding of relay MRL and battery. Relay MRL locks over its contact 3, contact 11 of relay TAN, to ground at contact 2 of relay 3714. At contact 4, relay MRL disconnects battery from conductor 3731, thereby releasing the marker connector and the marker. At contact 1, relay MRL disconnects ground from conductor 3724, releasing relay T in the trunk circuit.

With relay T released, relay A is again connected to the incoming trunk conductors T and R and reoperates.

Figure 2:
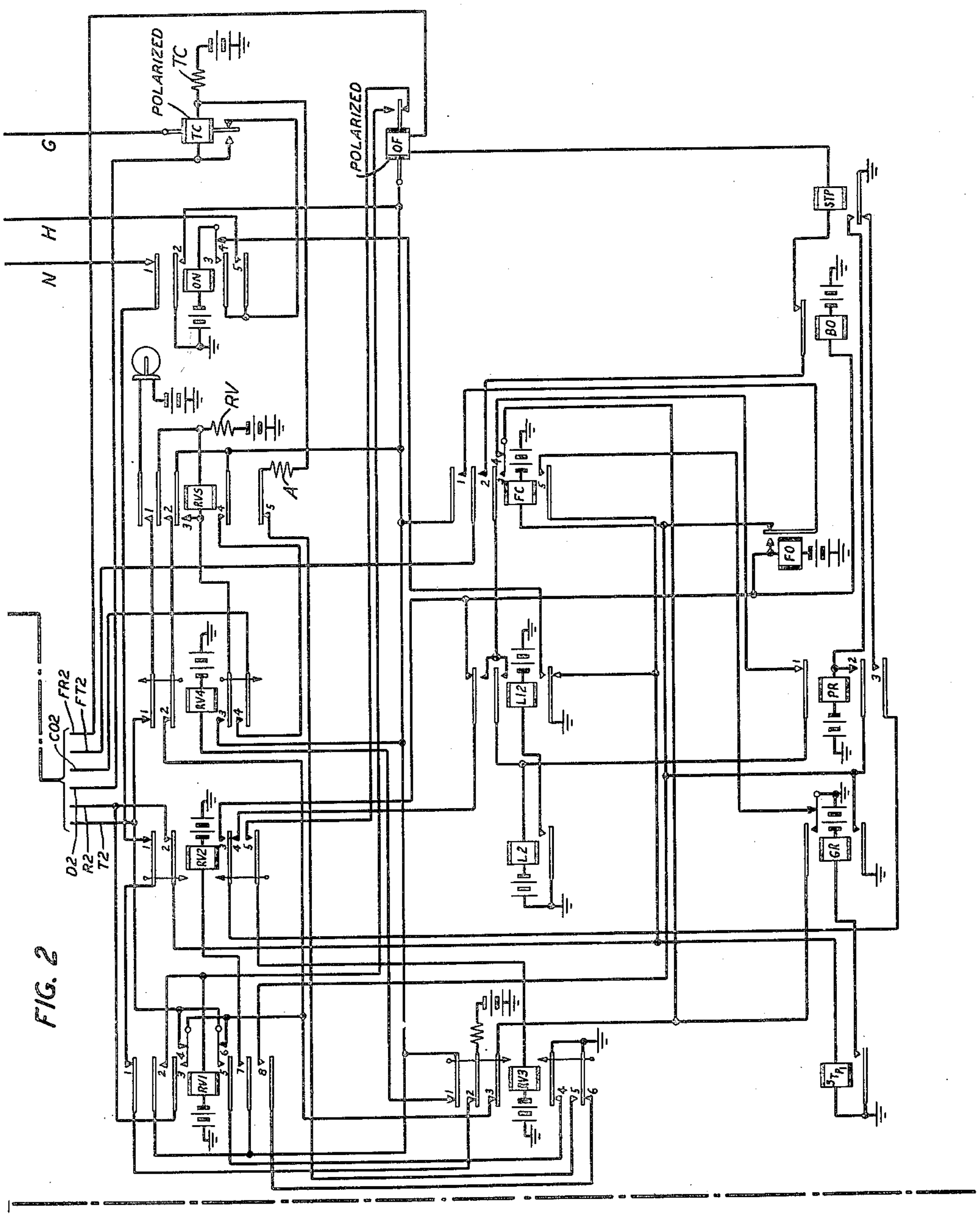
Fig. 2 shows a revertive pulse repeater.

When relay F was operated, as previously described, it closed a circuit from ground over its contact 1 to the winding of relay RST and battery. Relay RST operated, locking over its contact 3 to ground supplied to conductor SS from conductor 5146 in the sender. Therefore, when relay A reoperates, it closes a circuit from ground over its front contact, contact 8 of relay D, contact 2 of relay RST to conductor RST causing the repeater link circuit to operate and connect the incoming and outgoing trunk conductors to an idle revertive pulse repeater such as shown in Fig. 2. This connection is established and held under the control of a hold magnet, for example, magnet HM9.

The reconnection of relay A to the incoming trunk conductors T and R causes the originating sender to complete trunk test and connect the stepping relay to the trunk in readiness for receiving the first set of revertive pulses for transferring the line number.

With conductors T and R connected to conductors T2 and R2 through the repeater link, relay L2 of the revertive pulse repeater operates in a circuit for battery through its winding, contact 1 of relay PR, contact 4 of relay FC, contact 3 of relay RV3, contacts 4 and 6 of relay RV1, conductors T2 and T, through the stepping relay of the originating sender, back over conductor R to ground over contact 13 of relay D, contact 6 of relay T and contact 10 of relay D.

Relay L2 in operating closes an obvious circuit for relay L12, which in turn operates relay ON. Relay ON locks over contact 3, normal contact of relay TC, and conductor G to ground at contact 2 of the hold magnet HM9 and at contact 5 extends this locking ground over conductor H and contact 1 of hold magnet HM9 to the winding of that magnet to hold the link circuit, independent of the start circuit. At contact 2 relay ON closes a circuit which extends from ground at that contact over contact 1 of relay RV3 through the winding of relay RV4 to battery. Relay RV4 operates and closes a circuit from battery through resistance RV, winding of relay RV5, contact 3 of relay RV4 to ground at contact 2 of relay ON. Relay RV5 operates, locking over its contact 3 to ground at contact 2 of relay ON, independent of relay RV4.

With relays RV4 and RV5 operated a circuit is closed from ground at contact 2 of relay ON, contact 4 of relay RV5, contact 4 of relay RV4, conductor CO2, connected through the repeater link to conductor CO1, lower winding of relay H to battery. Relay H operates in this circuit, extending its operating ground over its contact 5, contact 2 of relay D to the winding of relay T, which operates, and again disconnects relay A from the incoming trunk, leaving the originating sender connected with the repeater of Fig. 2.

At contact 6 relay H connects ground through resistance S1, contact 6 of relay F to conductor S to hold the switches connecting the trunk of Fig. 1 with the incoming trunk at the terminating office. At contact 8, relay H connects ground to conductor CO completing a circuit extending through the sender link to conductor 3724, contact 3 of relay 3700, contact 2 of relay MRL, back contact of relay 3708 to battery through the winding of the sender release relay 3707, causing the sender to release, in turn releasing the sender link.

When relay T operates, it disconnects ground from conductor R, which extends through the repeater link to conductor R2, contact 2 of relay RV2 to the winding of relay STP1 and ground.

Relay STP1 operates in the incoming pulse circuit in series with relay L2 and the stepping relay of the sender, operating relay GR, which in turn operates relay FC. Relay FC locks over the back contact of relay FO and contact 1 of relay FC to ground at contact 2 of relay ON. With relay FC operated an outgoing pulsing circuit is closed from conductor T1, contact 2 of relay F, conductor FT1, through the repeater link to conductor FT2, contact 2 of relay FC, back contact of relay BO, windings of relays STP and OF, conductor FR2 through the repeater link to conductor FR1, contact 8 of relay F to conductor R1. These conductors extend to the terminating office where revertive pulses are generated in the setting of panel switches or by a terminating cross bar sender in accordance with the nature of that terminating office.

For a description of the detailed operation of the revertive pulse repeater of Fig. 2 in repeating pulses between the terminating office and the originating sender, reference is made to applicant's Patent No. 2,383,759, granted August 28, 1945.

When revertive pulsing is completed, a reverse battery pulse from the terminating office operates relay OF which operates relay RV1. Relay RV1 locks over its contact 2 to ground at contact 2 of relay ON and in turn operates relay RV2. At the end of the reverse battery pulse, relay OF releases closing a circuit from ground at contact 2 of relay ON, normal contact of relay OF, contact 5 of relay RV2 to battery through the winding of relay RV3.

Relay RV3 operates and at its contact 1 opens the circuit of relay RV4. Relay RV4 releases and disconnects ground from conductor CO2, releasing relay T, to reconnect relay A to the incoming conductors T and R. The circuit of relay H is also opened but, since relay H is slow to release it does not release at this time. With relay T released, ground is connected over contact 10 of relay D, contact 6 of relay T, contact 13 of relay D, conductor R through the repeater link to conductor R2, contact 3 of relay RV1, contact 2 of relay RV4, contact 2 of relay RV5 to battery through resistance RV in shunt of the winding of relay RV5, causing relay RV5 to release. The release of relay RV5 closes a circuit from ground over contact 5 of relay RV3, contact 5 of relay RV5, resistance A, winding of relay TC, conductor D2, through the repeater link to conductor D, contact 4 and upper winding of relay H to battery through resistance H to hold relay H operated. The circuit also extends from conductor D through the winding of relay D to battery.

Relay D operates in this circuit, but polarized relay TC is energized in the non-operate direction and continues to hold its right contact closed. Relay D in operating, connects ground at its contact 9 to resistance S1 and thence to conductor S to provide an additional holding circuit for the incoming and line link switches. At contacts 4 and 13 it opens the previously traced circuit for relay A and at contacts 5 and 12 closes a new circuit for that relay including the left windings of repeating coil R.

When trunk closure occurs at the originating office relay A operates and, with relay D operated, completes a circuit from ground over the contact of relay A, contact 7 of relay D, contact 2 of relay H, lower winding of relay D1 to battery. Relay D1 operates in this circuit, locking in a circuit from battery through its upper winding and contact 2 to ground at contact 1 of relay D. Relay D1 connects the outgoing tip and ring conductors T1 and R1, over contacts 2 and 8 of relay F, contacts 1 and 3 of relay D1 to the right windings of repeating coil R and the winding of polarized supervisory relay S, thereby establishing a trunk closure toward the terminating office. Relay D1 also closes a locking circuit for relay D under the control of relay A which may be traced from ground at the contact of relay A, contact 7 of relay D, contact 5 of relay D1, to battery through the winding of relay D. At its contact 4, relay D1 extends a branch from the locking circuit of relay D, over contact 3 of relay H to battery through resistance H, in shunt of the locking winding of relay H, causing relay H to release. The locking ground of relay D extends back over the operating circuit of relay D to conductor D, through the repeater link to conductor D2, winding of relay TC to battery through resistance TC. The values of resistances A and TC are such that relay TC may now operate, opening the locking circuit of relay ON, causing that relay to release and disconnect ground at its contact 2 from the holding circuits of the various relays in the revertive pulse repeater. The operation of relay TC also opens the holding circuit for hold magnet HM9, restoring the repeater link to normal. Relay TC is held operated over its left contact to ground on conductor G until magnet HM9 releases.

With relay D operated, the circuit of relay T is extended over contact 3 of relay D to the front contact of supervisory relay S and now serves to reverse the connection of battery and ground through the windings of relay A to the incoming conductors T and R in response to supervisory signals from the terminating office. The connection is held under the control of the calling subscriber.

In the sender, if relay 3020 is operated while handling a tandem call, for example because of trouble at the originating sender, battery is removed from conductor 3731 to cause the immediate release of the marker and ground is connected to resistance TAN1 to release relay TAN and permit the sender to complete its function as for a local call.

In the marker, while handling a tandem call, if no idle trunk can be found, relay 3908 is operated, connecting ground over contact 9 of relay TAN1, conductor 5664 through the marker connector to conductor RO3, contact 3 of relay TAN to the winding of relay 3020, which functions as above-described to release the marker and restore the sender to the local call condition.

To guard against false tandem indication to the marker by a false ground on conductors TAN3, TAN4 or the linkage in the marker connector, relay CK is connected to conductor TAN3 over contact 10 of relay TAN when relay TAN is not operated. If relay CK is operated, it extends its operating ground to conductor 5660 to prevent the normal release of the register relays and cause the marker to time out and make a trouble record.

While the trunk circuit shown in Fig. 1 is especially adapted for handling tandem calls, the invention is not limited to the use of separate trunks for local and tandem calls but may be used with trunks incorporating the features of both local and tandem trunks.

What is claimed is:

1. In a telephone system, an office, trunks incoming to said office, subscribers' lines and interoffice trunks outgoing from said office, register senders in said office, connecting means, means in one of said trunks to operate said connecting means to select one of said senders and to connect said selected sender with said one trunk, a plurality of registers in said sender, means operative over said one trunk to successively operate all of said registers to register the designation of a wanted line thereon, a plurality of switch controlling markers, means normally dependent on the operation of all of said registers for connecting a switch controlling marker with said sender, means to render said marker connecting means responsive to the operation of a predetermined lesser number of said registers, a register checking circuit in said marker normally completed under the control of all of said registers, means normally under the control of said checking circuit to cause said marker to control the extension of said incoming trunk to said wanted line, means to complete an alternative register checking circuit under the control of said predetermined lesser number of said registers and means under the control of said alternative register checking circuit to cause said marker to control the extension of said incoming trunk to one of said outgoing trunks.

2. In a telephone system, an office, trunks incoming to said office, subscribers' lines and interoffice trunks outgoing from said office, register senders in said office, connecting means, means in one of said trunks to operate said connecting means to select one of said senders and to connect said selected sender with said one trunk, a plurality of registers in said sender, means operative over said one trunk to operate all of said registers to register the designation of a wanted line thereon, a plurality of switch controlling markers, marker connecting means, means normally dependent on the operation of all of said registers to operate said marker connecting means and to release said sender, a local call relay and a tandem call relay in said sender, means under the control of said register operating means to successively operate said relays following the operation of each of the first two of said sender registers, means operated in accordance with the registration set up on said second register to selectively release one of said relays, means under the control of said local call relay while operated to render said tandem call relay ineffective and means under the control of said tandem call relay, following the release of said local call relay to operate said marker connecting means with a plurality of said registers unoperated.

3. In a telephone system, an office, trunks incoming to said office, subscribers' lines and interoffice trunks outgoing from said office, register senders in said office, connecting means, means in one of said trunks to operate said connecting means to select one of said senders and to connect said selected sender with said one trunk, a plurality of registers in said sender, means operative over said trunk to operate all of said registers to register the designation of a wanted line thereon, a plurality of switch controlling markers, marker connecting means, means normally dependent on the operation of all of said registers to operate said marker connecting means and to release said sender, a local call relay and a tandem call relay in said sender, means under the control of said register operating means to successively operate said relays following the operation of each of the first two of said registers, means operated in accordance with the registration set up on said second register to selectively release one of said relays, means under the control of said local call relay while operated to render said tandem call relay ineffective, means under the control of said tandem call relay, following the release of said local call relay to operate said marker connecting means with a plurality of said registers unoperated, and means under the control of said tandem call relay to render the connected marker effective to control the connection of said incoming trunk to an outgoing trunk.

4. In a telephone system, an office, trunks incoming to said office, subscribers' lines and interoffice trunks outgoing from said office, register senders in said office, connecting means, means in one of said trunks to operate said connecting means to select one of said senders and to connect said selected sender with said one trunk, a plurality of registers in said sender, means operative over said trunk to operate said registers, means normally dependent on the operation of all of said registers to register the designation of a wanted line for connecting a switch controlling marker with said sender, a plurality of registers in said marker operated from said sender registers, means in said marker under the control of all of said marker registers to control the connection of said incoming trunk with said designated line, a local call relay and a tandem call relay in said sender, means under the control of said register operating means to operate said local call relay following the operation of the first of said sender registers, means under the control of said register operating means and said local call relay to operate said tandem call relay following the operation of the second of said sender registers, means operated in acocrdance with the registration set up on said second register to selectively release one of said relays, means under the control of said local call relay while operated to render said tandem call relay ineffective, means under the control of said tandem call relay, following the release of said local call relay, for operating said marker connecting means with a plurality of said sender registers unoperated, and means under the control of said tandem call relay to render said marker effective to control the extension of said incoming trunk to one of said outgoing trunks with a plurality of said marker registers unoperated.

ROBERT CAMPBELL AVERY.

REFERENCES CITED

The following references are of record in the file of this patent:

UNITED STATES PATENTS

| Number | Name | Date |
|---|---|---|
| 1,541,388 | Polinkowsky | June 9, 1925 |
| 1,595,072 | Caverly | Aug. 10, 1926 |
| 2,283,395 | Strickler | May 19, 1942 |

FOREIGN PATENTS

| Number | Country | Date |
|---|---|---|
| 437,591 | Great Britain | Oct. 22, 1935 |